United States Patent

[11] 3,622,195

| [72] | Inventor | Charles S. Lautenbach |
| | | Rochester, Mich. |
| [21] | Appl. No. | 881,304 |
| [22] | Filed | Jan. 22, 1970 |
| [45] | Patented | Nov. 23, 1971 |
| [73] | Assignee | General Motors Corporation |
| | | Detroit, Mich. |

[54] VEHICLE FRAME AND BODY CONSTRUCTION
5 Claims, 3 Drawing Figs.

[52] U.S. Cl. .................................................. 296/35 R,
296/1 R
[51] Int. Cl. .................................................. B62d 27/04,
B62d 21/02
[50] Field of Search ................................................ 296/1 R, 28
R, 28 F, 35 R

[56] References Cited
UNITED STATES PATENTS

| 2,864,647 | 12/1958 | Chesna et al. ............... | 296/28 F |
| 2,883,232 | 4/1959 | Olley et al. ................... | 296/35 X |
| 3,140,891 | 7/1964 | Shreffler ....................... | 296/1 |
| 2,114,344 | 4/1938 | Haberstump ................. | 296/28 |
| 2,482,906 | 9/1949 | Goodwin et al. ............. | 296/28 |
| 3,177,031 | 4/1965 | Schilberg ..................... | 296/28 |
| 3,084,971 | 4/1963 | Schilberg ..................... | 296/28 |

*Primary Examiner*—Benjamin Hersh
*Assistant Examiner*—Leslie J. Paperner
*Attorneys*—Warren E. Finken and Herbert Furman ABSTRACT: A vehicle frame and body construction includes a generally U-shaped upwardly opening sill that has inner and outer sill members. The inner sill member has a vertical base section terminating in upper and lower inwardly extending lateral flanges. The outer sill member has a vertical wall section having an upper outwardly extending lateral flange and having a lower inwardly extending stepped portion including a lower lateral flange secured to the lower lateral flange of the inner sill member. A generally closed rectangular rocker structure is mounted on the vehicle frame and is received within the upwardly opening sill in a spaced relationship. The rocker structure includes a first rocker channel member that has a vertical base section terminating in an upper inwardly extending wall welded to the vehicle floor pan and in a lower inwardly extending wall terminating in a downwardly extending plate flange. A second rocker channel member fits within the first rocker channel member and has a vertical base section terminating in upper and lower walls welded to the walls of the first rocker channel member. A vertical plate has a lower portion welded to the downwardly extending plate flange of the first rocker channel member and an upper inwardly extending flange welded to the vehicle floor pan. A sealing strip extends between the rocker structure and the upper outwardly extending lateral flange of the outer sill member.

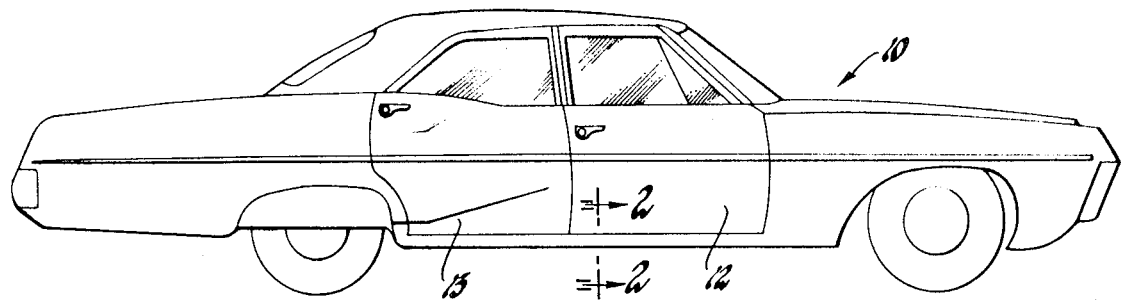
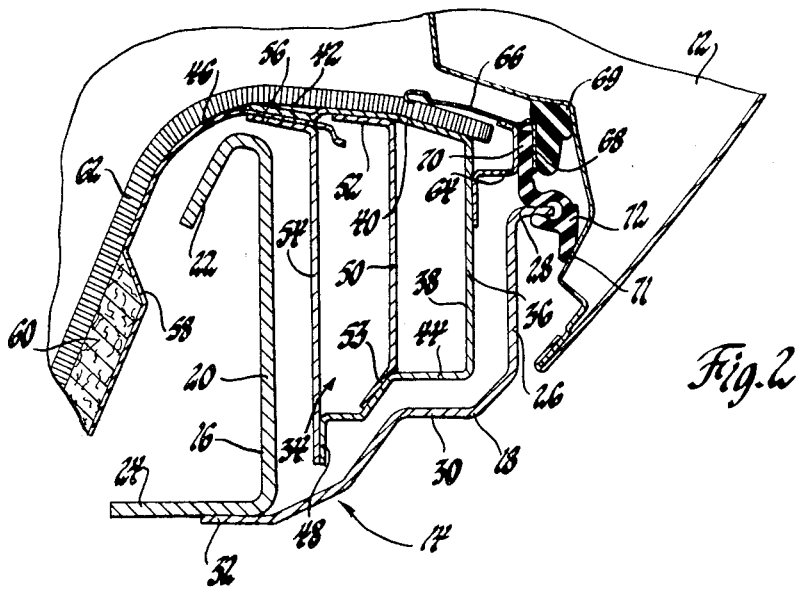
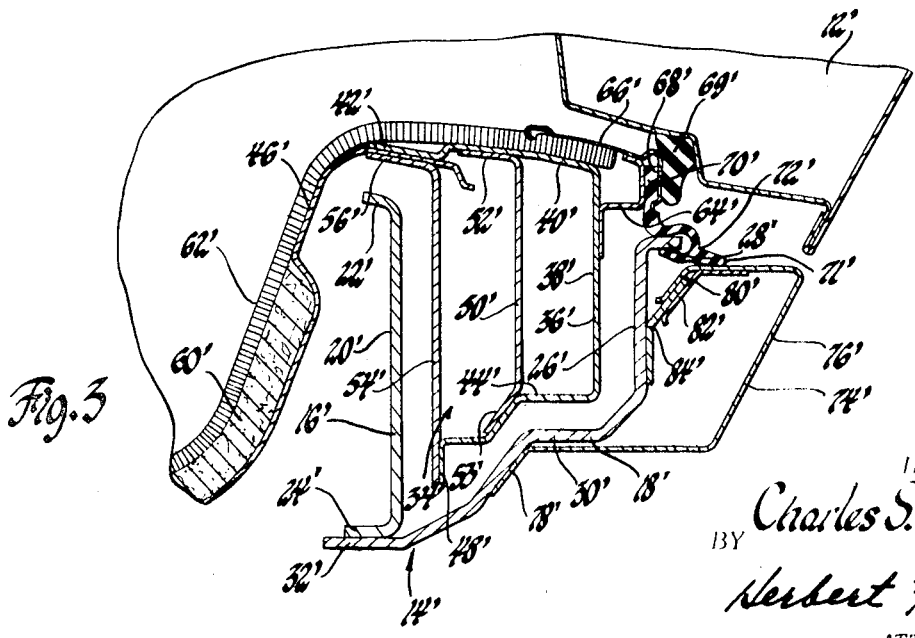
INVENTOR
Charles S. Lautenbach
BY Herbert Furman
ATTORNEY

VEHICLE FRAME AND BODY CONSTRUCTION This invention relates to a vehicle frame and body construction and more particularly to such a construction wherein the frame sill and the body rocker structure interfit to reduce the stepover width of the body at a door opening.

In a vehicle of conventional body-and-frame-type construction, the frame includes sills running longitudinally of the vehicle near the lower edge of the vehicle doors and the body includes rocker structures positioned outboard of the sills and running longitudinally of the vehicle between the front hinge pillars and the rear lock pillars. In this type of construction, the spacing and positioning of the sills and rocker structures control the width of the step over area which the passenger must negotiate during entrance into the vehicle. This invention provides an improved vehicle frame and body construction which reduces the width of the step over area by interfitting the sills and respective rocker structures.

An object of this invention is to provide a vehicle frame and body construction which reduces the step over area to a minimum by having a generally U-shaped upwardly opening sill which accepts a generally closed rectangular rocker structure in spaced relationship.

Other objects will become apparent from the following specification and drawing wherein:

FIG. 1 is a side view of a vehicle including a frame and body construction according to the invention;

FIG. 2 is an enlarged sectional view taken along the plane of line 2—2 of FIG. 1; and FIG. 3 is a view similar to FIG. 2 showing a modification of the invention.

FIG. 1 shows a vehicle generally indicated at 10 having a front door 12 and a rear door 13 hinged at their forward edges and locked at their rear edge in a conventional manner. The vehicle 10 is of a body-frame-type construction and generally includes a pair of like rocker structures of opposite hand extending between the front hinge pillars and the rear lock pillars, not shown, and the frame includes a pair of like sills of opposite hand running substantially parallel to and receiving respective rocker structures as will be hereinafter described.

FIG. 2 shows a right-hand frame and body construction according to the invention. Sill 14 opens upwardly and is of generally U-shaped cross section. Sill 14 includes an inner sill member 16 and an outer sill member 18. The inner sill member 16 has a vertical base section 20 terminating in an upper inwardly hooked flange 22 and a lower inwardly extending lateral flange 24. The outer sill member 18 has a vertical wall section 26 terminating in an upper outwardly extending lateral flange 28 and joined to a lower inwardly extending stepped portion 30. The stepped portion 30 has a lower lateral flange 32 welded to the lower lateral flange 24 of the inner sill member 16.

A generally closed rectangular rocker structure 34 is received within the upwardly opening sill 14 in spaced relationship thereto. The rocker structure 34 includes a first rocker channel member 36 having a vertical base section 38 terminating in an upper wall 40 having a stepped flange 42 and in a lower wall 44. The lower wall 44 is stepped similarly to the stepped portion 30 of the outer sill member 18 and includes a downwardly extending plate flange 48. A second rocker channel member 50 fits within the first rocker channel member 36 and has upper and lower walls 52 and 53 respectively welded to the upper and lower walls 40 and 44 of the first rocker channel member 36. A third rocker channel member or vertical plate 54 has a lower edge portion welded to the plate flange 48 of the first rocker channel member 36. An upper lateral flange 56 of the vertical plate 54 is located opposite the stepped flange 42 of the first rocker channel member 36 and the flanges 42 and 56 are spot welded to an edge portion of the vehicle floor pan 46.

The vehicle floor pan 46 has a stepped area 58 which receives padding 60. A floor covering 62 covers the padding 60, the floor pan 46, and the upper portion of the rocker structure 34.

A flanged support 64 welded to the vertical base section 38 partially supports a sill plate 66. The sill plate 66 is additionally supported by the floor covering 62 and is conventionally attached to the wall 40 of rocker structure 34 by sheet metal screws. The sill plate 66 has a flange 68 which cooperates with a flange of support 64 to retain a flange of a sealing strip 70. The sealing strip 70 further includes an intermediate U-shaped side opening portion 72 that accepts the upper flange 28 of the outer sill member 18. A conventional weather strip 69 attached to the door 12 seals against the flange 68 and a lower lip 71 of the sealing strip 70 seals against a lower portion of the door.

The rocker structure 34 is positioned within the upwardly opening sill 14 by spaced mounting means seated between the horizontal wall of stepped portion 30 and the juxtaposed lower wall 44 of the first rocker channel member 36. The mounting means includes a conventional apertured resilient washer positioned between the juxtaposed walls. The washer accepts a mounting bolt which is also accepted by apertures in the juxtaposed wall. The mounting means may alternately be provided by a mounting bolt running horizontally through apertures in the inner and outer sill members and apertures in the rocker structure and by suitable apertured resilient washers between wall section 26 and base section 38 and between base section 20 and plate 54.

It is thus clear that this invention provides a frame and body construction reducing the step over area.

FIG. 3 shows a modification of the invention shown in FIG. 2 and like components are indicated by like primed numerals and will not be described. The structure shown in FIG. 3 incorporates an outer trim molding 74' having an outer trim surface 76' providing a continuation of the outer surface of the vehicle door 12'. The outer trim molding 74' is welded to the outer sill member 18' at its lower end by flange 78'. At its upper end molding 74' has longitudinally spaced flanges 80' and 82' that are laterally offset and retained by a flange plate 84' welded to the vertical wall section 26' of the outer sill member 18'. The lower lip 71' of the sealing strip 70' seals against the top wall of the outer molding 74'.

Thus the invention provides a vehicle frame and body construction having a reduced stepover area.

I claim

1. A vehicle frame and body construction comprising, a frame including inner and outer sill members secured to each other and jointly defining a generally U-shaped upwardly opening sill, a body supported on the frame and including a plurality of rocker members defining a generally closed rectangular rocker structure received within the upwardly opening sill in a downwardly inserted spaced relationship with respect thereto, and means extending between said rocker structure and said sill to fixedly mount said rocker structure with respect to said sill.

2. A vehicle frame and body construction as recited in claim 1 including an outer trim molding mounted on the outer sill member.

3. A vehicle frame and body construction comprising, a frame including inner and outer sill members each having a vertical wall and a lower lateral flange, said flanges being secured to each other to position said sill members to provide a generally U-shaped upwardly opening sill, a body supported on the frame and including a plurality of rocker members providing a generally closed rectangular rocker structure received within the upwardly opening sill in a downwardly inserted spaced relationship with respect thereto, each of said rocker members including a vertical wall positioned parallel to the vertical walls of said inner and outer sill members, and means extending between said rocker structure and said sill to fixedly mount said rocker structure with respect to said sill.

4. A vehicle frame and body construction comprising, inner and outer sill members, said inner sill member including a vertical base section having a lower lateral flange, said outer sill member including a vertical wall section terminating in an upper outwardly extending flange and joined to a lower inwardly extending stepped portion having a flange secured to the lower lateral flange of said inner sill member to secure said sill members to each other in a relationship defining a generally U-shaped upwardly opening sill, a first rocker channel member including a vertical base section terminating in an upper inwardly extending wall and a lower inwardly extending wall having a downwardly extending plate flange, a second rocker channel member fitting within said first rocker channel member and having a vertical base section terminating in upper and lower walls secured to the upper and lower walls of said first rocker channel member, said first and second rocker channel members defining a first closed space, a vertical plate having a lower portion secured to the plate flange of said first rocker channel member and an upper laterally extending flange located opposite the upper wall of said first channel member and defining a second closed space with said first and second channel members, said upper laterally extending flange and said upper wall of said first channel member being located on opposite sides of a vehicle floor pan and secured thereto, and means mounting said rocker structure on said sill and positioning said rocker structure within said sill in a spaced relationship.

5. A vehicle frame and body construction as recited in claim 4 including a protective covering covering the upper surface of the vehicle floor pan and the upper surface of the upper wall of the first rocker channel member, and sealing means sealing the space between the rocker structure and the upper outwardly extending flange of the outer sill member.

* * * * *